United States Patent
Cole et al.

[15] 3,690,086
[45] Sept. 12, 1972

[54] WALL CONSTRUCTION

[72] Inventors: Robert Templeman Cole; Frederick John Whitbread, both of Winchester; John Colin Downer, Chandler's Ford, all of England

[73] Assignee: Conder International Limited, Winchester, Hampshire, England

[22] Filed: June 18, 1970

[21] Appl. No.: 47,363

[30] Foreign Application Priority Data

June 20, 1969 Great Britain...........31265/69

[52] U.S. Cl..................................................52/741
[51] Int. Cl..............................................E04g 21/00
[58] Field of Search..............52/741, 749, 745, 747

[56] References Cited

UNITED STATES PATENTS 1,409,729  3/1922  Kennedy......................52/741
1,692,438  11/1928  Gates..........................52/741 X
2,262,899  11/1941  Mechlin......................52/741 X Primary Examiner—Patrick D. Lawson
Attorney—Craig, Antonelli and Hill

[57] ABSTRACT

A method of erecting the whole or a portion of a building comprising erecting a temporarily weather-proof wall structure including wall members and glazing, and attaching water-proof outer cladding to the wall members so as to conceal the wall members. By attaching an outer cladding to wall members, wall members can be pre-fabricated and have larger tolerances than otherwise possible. Furthermore the appearance of walls having outer cladding is not effected by minor damage caused to wall members during transit and installation.

10 Claims, 4 Drawing Figures

PATENTED SEP 12 1972 3,690,086

INVENTORS
ROBERT TEMPLEMAN COLE
ET AL.
BY
Craig, Antonelli, Stewart + Hill
ATTORNEYS

WALL CONSTRUCTION

This invention relates to an improved wall construction, the wall arranged to have attached thereto outer cladding, and a method of erecting a building including the improved wall construction.

According to the invention, there is provided a method of erecting the whole or a portion of a building comprising erecting a temporarily weather-proof wall structure including wall members and glazing, the temporarily weather-proof wall structure being arranged to receive a weather-proof outer cladding which substantially conceals the wall members; the portion may be, for instance, an extension of an existing building; alternatively, a gap may be left in the wall structure for the addition of say an entrance hall or a part of the wall structure may have a different treatment, e.g. being a brick wall for architectural effect.

The method may comprise erecting a temporarily weather-proof structure including wall members, glazing and a roof, the wall members being arranged to be substantially concealed by an outer cladding.

The method according to the invention may include securing wall members to a frame, so that outer cladding can be attached to the wall members with a cavity therebetween, if desired.

The wall members can act as thermal insulators. The outer cladding should be substantially water-proof or weather-proof, but need not be so. The glazing will be fully weather-proof.

The outer cladding further may provide a decorative finish to the wall; the outer cladding may be of brick, tile, metal, asbestos, wood, plastic or similar material.

The dead load of the outer cladding and any superimposed loads, such as wind, may be transmitted to the frame of the wall by way of the wall members.

Preferably, the wall members are performed or factory-made.

The wall members may comprise a framework having a laminar sheathing such as plywood. Insulating material may be arranged beneath the laminar sheathing. Furthermore, a vapor barrier may be provided by a polythene sheet arranged between the laminar sheathing and the framework of the wall member.

The wall members may comprise a braced frame for providing rigidity to the wall structure.

The frame of a wall member may be of timber. It may also incorporate bracing members, e.g. a K-frame of hot rolled steel, for instance with the "upright" of the K running along the bottom of the member and the arms of the K running up to the upper corners of the member.

The wall members may have a sheathing of asbestos board, or similar material.

Alternatively the members may be solid units. The solid units are preferably of a material which permits simple and direct fixing of other building components on all faces with a high degree of flexibility.

The frame of the wall structure may be formed from steel sections which are bolted together.

The outer cladding may be attached to the wall members by battens. In particular, when timber framing of the wall member is used, it is desirable if an air flow is provided so that the timber can breathe. For ease of fixing, the battens are preferably of timber, so that the outer cladding can be secured by screws.

The battens may be arranged to extend either horizontally or vertically. Preferably, the battens are arranged to avoid continuous contact with the adjacent wall member and/or the outer cladding so that the cavity is arranged to be drained.

A flanged strip may be mounted generally horizontally on the upper part of the wall member, so that the flange projects downwards outside the outer cladding attached to wall member to provide a top shield for the outer cladding and any cavity.

For speed or erection on site, a building should be prefabricated in units. However, large, pre-finished units can be bulky and heavy, and easily damaged in handling; in particular a relatively fragile cladding can very easily be damaged and so preclude an otherwise sound unit from use. It can be more economic to prefabricate a basic unit or wall member, which can tolerate minor damage, and then after positioning the unit in a wall to attach the outer cladding.

Wall members in the method or building according to the invention do not need to be finished externally, and therefore very careful handling, to avoid damage to the external surface, is not necessary, thereby speeding erection of the building shell.

Since the joints between wall members can be ultimately concealed and shielded by the outer cladding relatively wide gaps between wall members are permissible, to absorb any dimensional inaccuracies in the building frame and in the wall members themselves. As a result close joint tolerances can be avoided.

Resilient strips such as expanded polyethylene foam may be inserted between two adjacent wall members to provide a wind-proof and temporarily weather-proof joint.

An outer cladding may be arranged to cover a joint between two adjacent wall members.

The wall members may be arranged so as to be capable of having members fixed to each of its faces.

A sheet of breathable building paper may be fixed between a wall member and its outer cladding.

Since the outer cladding is fixed to the wall members and not to the frame of the building, weather-tight joints in the outer cladding are not effected by inaccuracies in the building frame, and may be made to fit very accurately.

Thus, a building having walls according to the invention may be sufficiently completed and made weather-proof in a short time, so that internal building work can commence; the outer cladding can be attached later.

The wall members may carry advertising material on their external face.

Panels can be arranged on the inside of the wall members as necessary to provide the normal degrees of fire resistance required of the wall construction.

The invention extends to a wall structure erected according to the invention. Furthermore, the invention extends to a building having such a wall structure.

The invention will be further described, by way of example, with reference to the accompanying drawings, of which:

Figure 3:
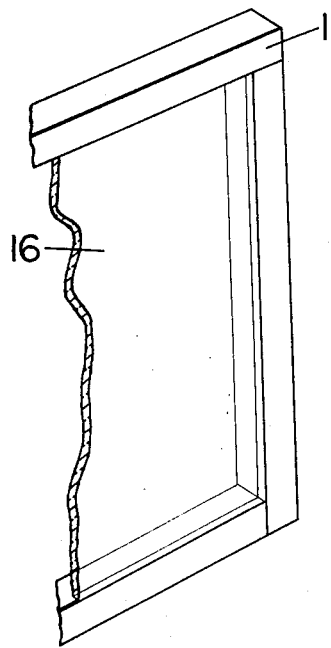
FIG. 3 shows a partial perspective view of a part of a building having glazing therein.

A building is constructed with a steel frame 1 which is secured together by bolts 2. A wall member 3 is secured to part of the frame 1 by means of bolts 4. The wall member 3 has battens 5 of timber to which outer cladding is to be attached by screws. FIG. 3 shows a frame 1 with a glazing 16 therein.

Figure 1:
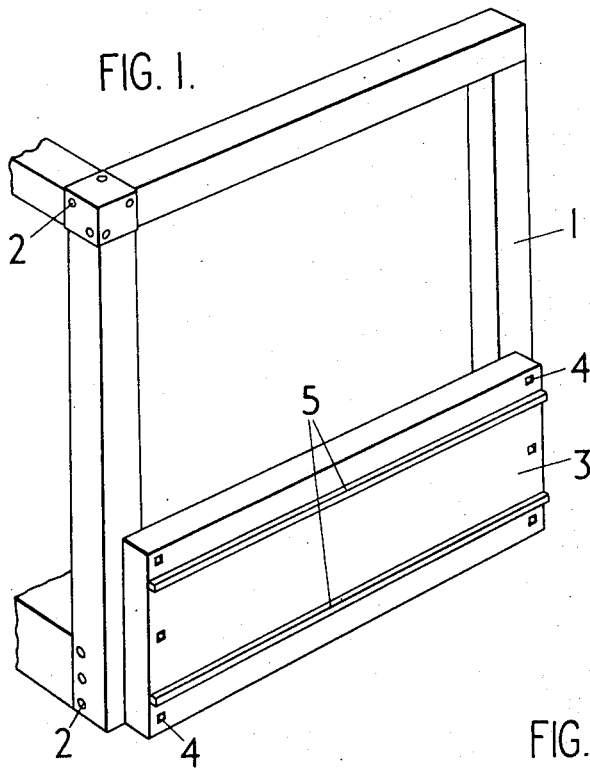
FIG. 1 shows a perspective view of part of a building which is partly completed.
Figure 2:
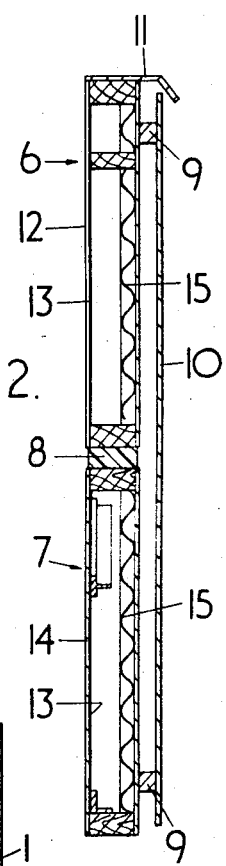
FIG. 2 shows in cross-section wall members having an outer cladding attached thereto.

As shown in FIG. 2, an upper wall member 6 and a lower wall member 7 are positioned adjacent to one another, the joint between which is filled with a resilient seal 8, for example expanded polyethylene foam 8. The wall members 6 and 7 have timber battens 9 secured to their outer faces. An outer cladding member 10 is screwed to the battens 9, so that the joint 8 is shielded.

A shield 11, which may be of aluminum, is provided to shield the top of the cavity from rain and dust. The cavity is ventilated at the bottom.

Figure 4:
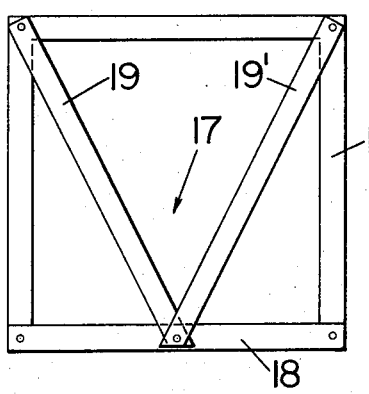
FIG. 4 shows a schematic rear view of a wall member having a K-frame.

The wall member 6 has a frame of timber, and the wall member 7 has a K-frame 17, as shown in FIG. 4, of hot rolled steel which braces the wall member and the frame 1 of the building, so that it can be used as a structural wall member. The "upright" 18 of the K extends along the bottom of wall member frame 1 and the arms 19, 19' of the K are arranged to run up to the upper corners of the wall members. The wall member 7 also has timbers for supporting the sheathing.

The inner sheathing of the wall member 6 is formed by a plywood sheet 12. Behind the plywood sheet 12 is placed a polythene sheet 13 which provides a vapor barrier.

Wall member 7 has the inner plywood sheathing 12 replaced by asbestos board sheeting 14. This provides an improved fire protection.

An insulating quilt 15 is provided beneath the outer sheathing of the wall members 6 and 7.

We claim:

1. A method of erecting the whole or a portion of a building comprising:
   erecting a temporarily weather-proof wall structure including wall members and glazing, attaching weather-proof outer cladding so as to conceal the wall members, and providing a cavity between the wall members and the outer cladding, wherein the cavity is provided by battens arranged to space the outer cladding from the wall members the battens being mounted to avoid continuous contact with the adjacent wall member or the outer cladding so that the cavity is arranged to be ventilated.

2. A method of erecting the whole or a portion of a building comprising:
   erecting a temporarily weather-proof wall structure including wall members and glazing, and attaching weather-proof outer cladding to the wall members so as to conceal the wall members, wherein the wall members have a bracing frame in the form of a K, the "upright" of the K being arranged to run along the bottom of the wall member and the arms of the K arranged to run up to the upper corners of the wall members.

3. A method of erecting the whole or a portion of a building comprising:
   erecting a temporarily weather-proof wall structure including wall members and glazing, and attaching weather-proof outer cladding to the wall members so as to conceal the wall members, wherein the method further includes mounting a flanged strip generally horizontally on the upper part of a wall member, so that the flange is arranged to project downwards outside the outer cladding when attached to the wall member to provide a top shield for the outer cladding.

4. A building wall structure comprising inner wall members having an inside surface and an outside surface, an outer cladding means attached to said outer surface for concealing said outer surface and for permanently weather-proofing the wall structure, the the outer surface of the inner wall members being weather-proofed for temporarily protecting the wall structure and associated building from the elements during the time between the erection of the inner wall members and the attachment of the outer cladding means, wherein at least two inner wall members are provided, the outer cladding means being spaced from the inner wall members by way of battens attached respectively both to the outer surface of said inner wall members and to the outer cladding means whereby a cavity is formed between the inner wall members and the outer cladding means, said battens being positioned on one of said inner wall members such as to avoid continuous contact with both another adjacent inner wall member and the outer cladding so that the cavity between the inner wall and the cladding can be ventilated.

5. A building wall structure comprising at least one inner wall member having an inside surface and an outside surface, an outer cladding means attached to said outer surface for concealing said outer surface and for permanently weather-proofing the wall structure, the outer surface of the inner wall member being weather-proofed for temporarily protecting the wall structure and associated building from the elements during the time between the erection of the inner wall member and the attachment of the outer cladding means, wherein the at least one inner wall member has a bracing frame in the form of a K, the "upright" of the K being arranged to run along the bottom of the wall member and the arms of the K arranged to run up to the upper corners of the wall member.

6. A building wall structure comprising at least one inner wall member having an inside surface and an outside surface, an outer cladding means attached to said outer surface for concealing said outer surface and for permanently weather-proofing the wall structure, the outer surface of the inner wall member being weather-proofed for temporarily protecting the wall structure and associated building from the elements during the time between the erection of the inner wall member and the attachment of the outer cladding means, wherein a flanged strip is mounted generally horizontally on the upper part of the inner wall member, said flanged strip including a downwardly projecting portion extending outwardly from the inner wall member to a position outside of the outer cladding so as to form a top shield for the outer cladding.

7. A method of erecting the whole or a portion of a building, comprising:
   erecting a load-bearing frame;
   attaching panels to said frame, thereby forming a wall structure, the outer surfaces of said panels being weather-proof for temporarily protecting said wall structure from the elements, said panels including a framework having a laminar sheathing, insulating material arranged beneath the laminar sheathing, and a vapor barrier in the form of a plastic sheet arranged between the laminar sheathing and the said panels being capable of carrying their own dead weight and being capable of carrying substantial wind loads back to said frame, and said panels defining window openings; providing glazing in said window openings; and subsequently attaching an outer, permanently weather-proof cladding to said panels, said panels being capable of carrying the dead weight and wind loads of said outer cladding back to said frame; whereby said panels and glazing protect said building or portion thereof from the elements during the time between (a) the attachment of said panels to said frame and the provision of said glazing in said window openings and (b) the attachment of said outer cladding to said panels.

8. A method according to claim 7, further comprising supporting said glazing by said panels, said panels being capable of carrying the dead weight and wind loads of said glazing back to said frame.

9. A building wall structure arrangement comprising:
a load-bearing frame;
panels attached to said frame for forming a temporary wall structure, the outer surfaces of said panels being weather-proof for temporarily protecting said wall structure from the elements, said panels including a framework having a laminar sheathing, insulating material arranged beneath the laminar sheathing and a vapor barrier in the form of a plastic sheet arranged between the laminar sheathing and the framework, said panels being capable of carrying their own dead weight and being capable of carrying substantial wind loads back to said frame, and said panels defining window openings; glazing positioned to close said window openings, and an outer permanently weather-proof cladding attached to said panels, said panels further being capable of carrying the dead weight and wind loads of said outer cladding back to said frame; whereby said panels and glazing protect a building from the elements during the time between (a) the attachment of said panels to said frame and the provision of said glazing in said window openings and (b) the attachment of said outer cladding to said panels.

10. An arrangement according to claim 9, wherein said glazing is supported by said panels, and wherein said panels are capable of carrying the dead weight and wind loads of said glazing back to said frame.

* * * * *